United States Patent
Lu et al.

(10) Patent No.: US 12,413,769 B2
(45) Date of Patent: *Sep. 9, 2025

(54) CANVAS SIZE SCALABLE VIDEO CODING

(71) Applicant: Dolby Laboratories Licensing Corporation, San Francisco, CA (US)

(72) Inventors: Taoran Lu, Santa Clara, CA (US); Fangjun Pu, Sunnyvale, CA (US); Peng Yin, Ithaca, NY (US); Sean Thomas McCarthy, San Francisco, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,411

(22) Filed: Dec. 18, 2023

(65) Prior Publication Data
US 2024/0121424 A1 Apr. 11, 2024

Related U.S. Application Data

(63) Continuation of application No. 17/629,093, filed as application No. PCT/US2020/045043 on Aug. 5, 2020, now Pat. No. 11,877,000.
(Continued)

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/172* (2014.11); *H04N 19/33* (2014.11)

(58) Field of Classification Search
CPC .. H04N 19/513; H04N 19/105; H04N 19/172; H04N 19/33; H04N 19/17; H04N 19/187; H04N 19/70; H04N 19/167
See application file for complete search history.

(56) References Cited

U.S. PATENT DOCUMENTS 9,554,132 B2   1/2017   Crenshaw
10,063,886 B2  8/2018   Ye
(Continued)

FOREIGN PATENT DOCUMENTS

CN    104813665 A    7/2015
CN    105744251 A    7/2016
(Continued)

OTHER PUBLICATIONS

Alshina et al: "Re-sampling process modification considering cropping information", JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/, No. JCTVC-Q0200-v2, Apr. 1, 2014, pp. 1-5.
(Continued)

*Primary Examiner* — Richard T Torrente

(57) ABSTRACT

Methods and systems for canvas size scalability across the same or different bitstream layers of a video coded bitstream are described. Offset parameters for a conformance window, a reference region of interest (ROI) in a reference layer, and a current ROI in a current layer are received. The width and height of a current ROI and a reference ROI are computed based on the offset parameters and they are used to generate a width and height scaling factor to be used by a reference picture resampling unit to generate an output picture based on the current ROI and the reference ROI.

6 Claims, 7 Drawing Sheets

Related U.S. Application Data

(60) Provisional application No. 62/945,931, filed on Dec. 10, 2019, provisional application No. 62/902,818, filed on Sep. 19, 2019, provisional application No. 62/883,195, filed on Aug. 6, 2019.

(51) Int. Cl.
  *H04N 19/172* (2014.01)
  *H04N 19/33* (2014.01)

(56) References Cited

U.S. PATENT DOCUMENTS

| | | |
|---|---|---|
| 10,110,890 B2 | 10/2018 | Haque |
| 10,116,952 B2 | 10/2018 | Lin |
| 10,148,983 B2 | 12/2018 | Hendry |
| 10,999,585 B2 | 5/2021 | Atkins |
| 2013/0034170 A1 | 2/2013 | Chen |
| 2014/0192901 A1 | 7/2014 | Wang |
| 2014/0328398 A1 | 11/2014 | Chen |
| 2015/0195573 A1 | 7/2015 | Aflaki Beni |
| 2015/0201198 A1 | 7/2015 | Marlatt |
| 2015/0312580 A1* | 10/2015 | Hannuksela ............ G06F 9/268 375/240.02 |
| 2016/0073118 A1 | 3/2016 | Iguchi |
| 2016/0073119 A1 | 3/2016 | Toma |
| 2016/0100187 A1 | 4/2016 | Lee |
| 2016/0165276 A1 | 6/2016 | Toma |
| 2016/0191932 A1 | 6/2016 | Toma |
| 2016/0234500 A1 | 8/2016 | Tsukagoshi |
| 2016/0295257 A1 | 10/2016 | Iguchi |
| 2017/0034532 A1* | 2/2017 | Yamamoto ............ H04N 19/61 |
| 2017/0085917 A1 | 3/2017 | Hannuksela |
| 2017/0105015 A1 | 4/2017 | Haque |
| 2017/0105019 A1 | 4/2017 | Redmann |
| 2017/0127070 A1 | 5/2017 | Suzuki |
| 2017/0264861 A1 | 9/2017 | Xu |
| 2017/0359611 A1 | 12/2017 | Iguchi |
| 2018/0063542 A1 | 3/2018 | Haque |
| 2018/0098079 A1 | 4/2018 | Chuang |
| 2018/0146235 A1 | 5/2018 | Tsukagoshi |
| 2018/0166102 A1 | 6/2018 | Newman |
| 2019/0045116 A1 | 2/2019 | Yamamoto |

FOREIGN PATENT DOCUMENTS

| | | |
|---|---|---|
| CN | 107153876 A | 9/2017 |
| CN | 105359526 B | 8/2019 |
| EP | 3120562 B1 | 3/2020 |
| JP | 2016506691 A | 3/2016 |
| JP | 2016226035 A | 12/2016 |
| JP | 2017005723 A | 1/2017 |
| JP | 2018534827 A | 11/2018 |
| WO | 2015053287 A1 | 4/2015 |
| WO | 2015115946 A1 | 8/2015 |
| WO | 2018123542 A1 | 7/2018 |
| WO | 2019067762 A1 | 4/2019 |

OTHER PUBLICATIONS

Brendel, H. et al "What is more Compelling: More Pixels or Higher Frame Rate?" SMPTE 2012, pp. 1-50.

Bross B et al: "Versatile Video Coding (Draft 6)", Joint Video Experts Team (JVET) of ITU-T SG 16 WP 3 and ISO/IEC JTC 1/SC 29/WG 11, 15th Meeting: Gothernburg, SE, Jul. 3-12, 2019, Document: JVET-O2001-v3, pp. 1-421.

Bross, B. et al "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v54, pp. 1-287.

Carbonara, C. et al "High Frame Rate Capture and Production" SMPTE Meeting Presentation, 2015 Society of Motion Picture & Television Engineers, pp. 1-19.

Infrastructure of audiovisual services—Transmission multiplexing and synchronization, H.222.0, Series H, Generic coding of moving pictures and associated audio information: Systems, ITU, Aug. 2018, pp. 1-306.

ITU H.265 "High Efficiency Video Coding" Series of moving Video, ITU Feb. 2018.

Boyce et al, "Overview of SHVC: Scalable Extensions of the High Efficiency Video Coding (HEVC) Standard", IEEE Transactions on Circuits and Systems for Video Technology, vol. 26, No. 1. Jan. 1, 2015, pp. 20-34, 15 pages.

Mackin et al "A Frame Rate Conversion Method Based on a Virtual Shutter Angle" IEEE International Conference on Image Processing, Sep. 22, 2019, pp. 4215-4219, 5 pages.

McCarthy, S. et al "AHG7: Indication of Shutter Angle for Variable Frame Rate Application" Joint Collaborative Team on Video Coding (JCT-VC) ofITU-T SG 16 WP 3 and 1S0/IEC JTC 1/SC 29/WVG 11, 36th Meeting: Gothenburg, SE, Jul. 6-12, 2019, Document: JCTVC-AJ0029-v2, pp. 1-5.

Mitchell, Nick "Digital Cinema Mastering" Considerations for Higher Frame Rates SMPTE 2012, pp. 1-48.

Omori, Y. et al "A 120 fps High Frame Rate Real-Time HEVC Video Encoder with Parallel Configuration Scalable to 1K" IEEE Transactions on Multi-Scale Computing Systems, vol. 4, No. 4, Oct.-Dec. 2018, pp. 491-499, 9 pages.

Skupin et al., "AHG12: On filtering of independently coded region," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0494-v3, pp. 1-5.

Sullivan, A. et al "On Frame Rate Support and Extraction in VVC" Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M_Notes_d7, pp. 1-259.

Sullivan G. et al. "Meeting report of the 36th meeting of the Joint Collaborative Team on Video Coding." In: Joint Collaborative Team on Video Coding (JCT-VC) of ITU-T SG16 WP3 and ISO/IEC JTC1/SC29/WG11; 37th Meeting: Geneva, CH, Oct. 4-11, 2019, Document: JCTVC-AJ_Logistics (v1), pp. 1-3.

Text of ISO/IEC CD 23090-3, ISO/IEC JTC 1/SC 29 /WG 11 N 18692, 27, MPEG Meeting; Jul. 12, 2019, Text of ISO/IEC CD 23090-3, ISO/IEC JTC 1/SC 29/WG 11, pp. 1-105.

Ugur, K. et al "Exif Data SEI Message", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: Document: JCTVC-J_Notes_dBA.

Wenger et al, "AHG8: Spatial Scalability using Reference Picture Resampling," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0045, pp. 1-3.

* cited by examiner

CANVAS SIZE SCALABLE VIDEO CODING

CROSS-REFERENCE TO RELATED APPLICATIONS

The present application is a continuation of U.S. patent application Ser. No. 17/629,093, filed on Jan. 21, 2022, which is the national stage entry for PCT/US2020/045043, filed on Aug. 5, 2020, which claims the benefit of priority from U.S. Provisional Applications: Ser. No. 62/883,195 filed on Aug. 6, 2019, Ser. No. 62/902,818, filed on Sep. 19, 2019, and Ser. No. 62/945,931, filed on Dec. 10, 2019.

TECHNOLOGY

The present document relates generally to images. More particularly, an embodiment of the present invention relates to canvas size scalable video coding.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range (SDR), while images where n>8 may be considered images of enhanced dynamic range. HDR images may also be stored and distributed using high-precision (e.g., 16-bit) floating-point formats, such as the OpenEXR file format developed by Industrial Light and Magic.

Currently, distribution of video high dynamic range content, such as Dolby Vision from Dolby laboratories or HDR10 in Blue-Ray, is limited to 4K resolution (e.g., 4096×2160 or 3840×2160, and the like) and 60 frames per second (fps) by the capabilities of many playback devices. In future versions, it is anticipated that content of up to 8K resolution (e.g., 7680×4320) and 120 fps may be available for distribution and playback. It is desirable that future content types will be compatible with existing playback devices in order to simplify an HDR playback content ecosystem, such as Dolby Vision. Ideally, content producers should be able to adopt and distribute future HDR technologies without having to also derive and distribute special versions of the content that are compatible with existing HDR devices (such as HDR10 or Dolby Vision). As appreciated by the inventors here, improved techniques for the scalable distribution of video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

For the picture regions of FIG. 2A.

DESCRIPTION OF EXAMPLE EMBODIMENTS

Example embodiments that relate to canvas size scalability for video coding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

Summary

Example embodiments described herein relate to canvas-size scalability in video coding. In an embodiment, a processor
  receives offset parameters for a conformance window in a first layer;
  accesses reference picture width and reference picture height for a coded region in a reference layer;
  receives offset parameters for a first region of interest (ROI) in the first layer;

receives offset parameters for a second ROI in the reference layer;
computes a first picture width and a first picture height for a coded region in the first layer based on the offset parameters for the conformance window;
computes a second picture width and a second picture height for a current ROI in the first layer based on the first picture width, the first picture height, and the offset parameters for the first ROI in the first layer; 16
computes a third picture width and a third picture height for a reference ROI in the reference layer based on the reference picture width, the reference picture height, and the offset parameters for the second ROI in the reference layer;
computes a horizontal scaling factor based on the second picture width and the third picture width;
computes a vertical scaling factor based on the second picture height and the third picture height;
scales the reference ROI based on the horizontal scaling factor and the vertical scaling factor to generate a scaled reference ROI; and
generates an output picture based on the current ROI and the scaled reference ROI.

Figure 1:
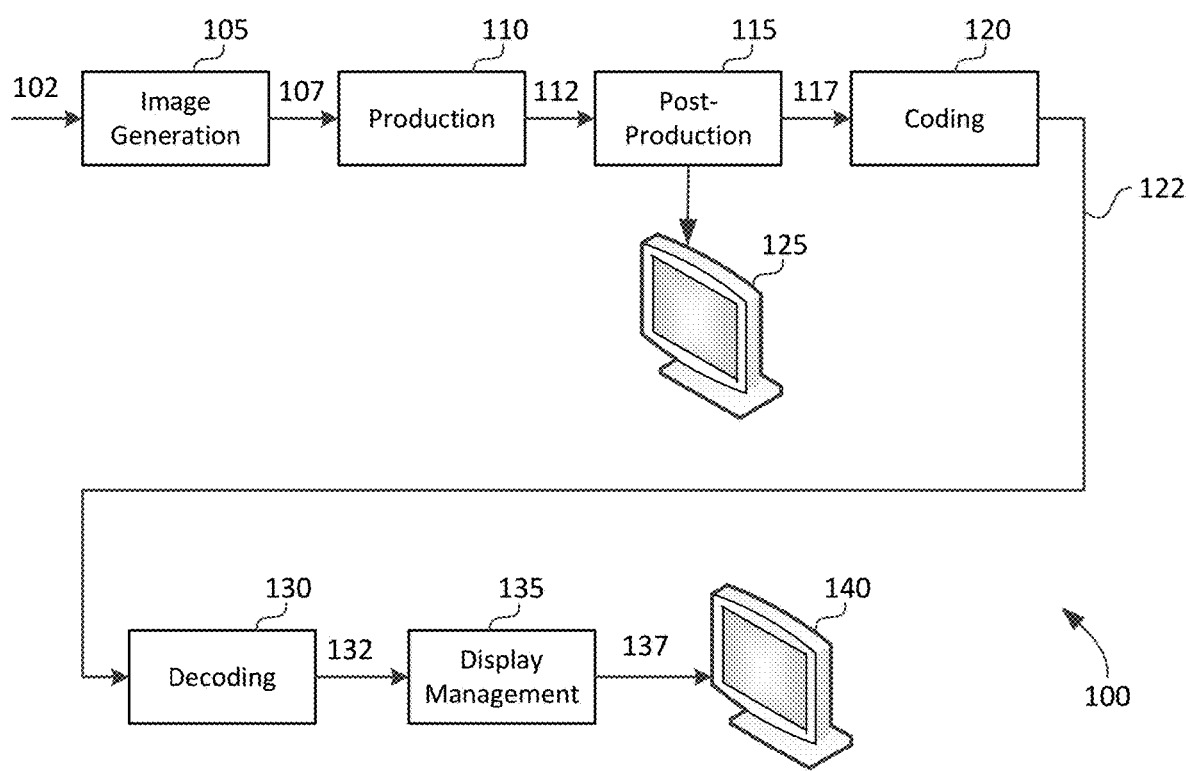
FIG. 1 depicts an example process for a video delivery pipeline.

In a second embodiment, a decoder:
receives offset parameters for a conformance window in a first layer;
accesses reference picture width and reference picture height for a coded region in a reference layer;
receives adjusted offset parameters for a first region of interest (ROI) in the first layer, wherein the adjusted offset parameters combine offset parameters for the first ROI with the offset parameters for the conformance window in the first layer;
receives adjusted offset parameters for a second ROI in the reference layer, wherein the adjusted offset parameters combine offset parameters for the second ROI with offset parameters for a conformance window in the reference layer;
computes a first picture width and a first picture height for a current ROI in the first layer based on the adjusted offset parameters for the first ROI in the first layer;
computes a second picture width and a second picture height for a reference ROI in the reference layer based on the adjusted offset parameters for the second ROI in the reference layer;
computes a horizontal scaling factor based on the first picture width and the second picture width;
computes a vertical scaling factor based on the first picture height and the second picture height;
scales the reference ROI based on the horizontal scaling factor and the vertical scaling factor to generate a scaled reference ROI; and
generates an output picture based on the current ROI and the scaled reference ROI Example Video Delivery Processing Pipeline FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, judder or blur control, frame rate control, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Scalable Coding

Scalable coding is already part of a number of video coding standards, such as, MPEG-2, AVC, and HEVC. In embodiments of this invention, scalable coding is extended to improve performance and flexibility, especially as it relates to very high resolution HDR content.

Canvas Size Scalability

As known in the art, spatial scalability is used mainly to allow a decoder to create content at various resolutions. In embodiments of this invention spatial or canvas scalability is designed to allow extraction of different regions of the image. For example, a content producer may choose to frame content (that is, specify the viewing region) differently for a large display than for a small display. For example, the framed regions to display may depend on the size of the screen or the distance of the screen to the viewer. Embodiments of this invention split an image into overlapping regions (typically rectangular) and encode them in such a way that a select number of sub-regions can be decoded independently from other sub-regions for presentation.

Figure 2A:
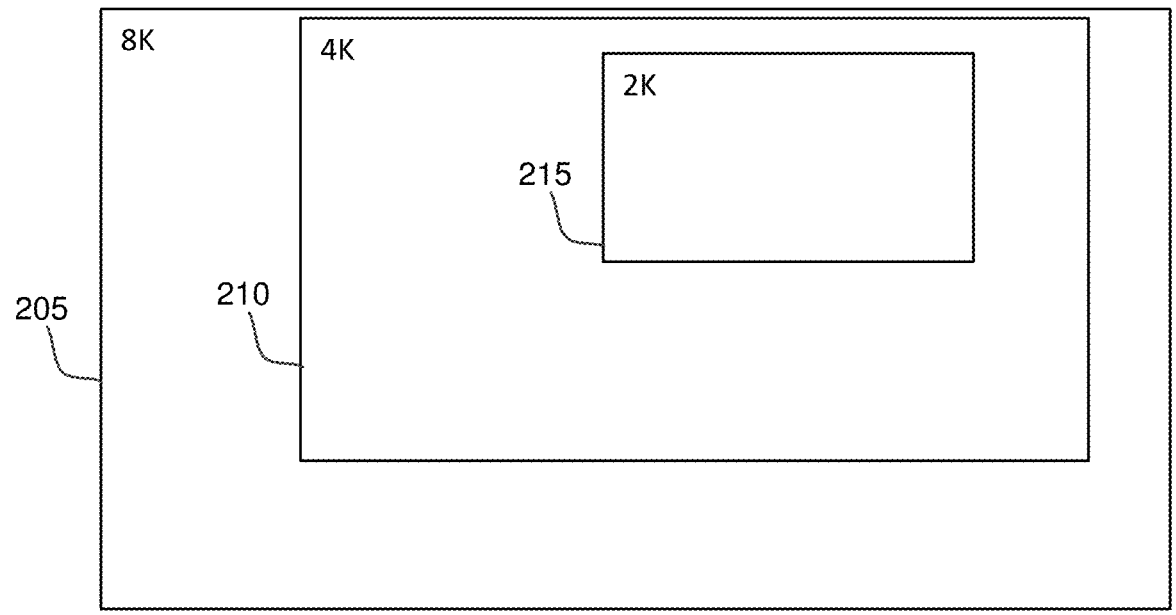
FIG. 2A depicts an example of picture subregions to define viewing regions of the input content according to the resolution of a target display.

An example is shown in FIG. 2A where the various regions encompass and/or are encompassed by other regions. As an example, the smallest region (215) has a 2K resolution and the largest region (205) has an 8K resolution. The base layer bitstream corresponds to the smallest spatial region, while additional layers in the bitstream correspond to increasingly larger image regions. Thus, a 2K display will only display the content within the 2K region (215). A 4K display will display the content of both the 2K and 4K regions (area within 210), and an 8K display will display everything within the 205 border. In another example, a 2K display may display a down-sampled version of a 4K content and a 4K display may display a down-sampled version of 8K content. Ideally, the base layer region can be decoded by legacy devices, while the other regions can be used by future devices to extend the canvas size.

Existing coding standards, such as HEVC, may enable canvas scalability using tiles. In a tile representation, a frame is divided into a set of rectangular, non-overlapping regions. A receiver can decide to decode and display only the set of tiles required for display. In HEVC, coding dependencies between tiles are disabled. Specifically, entropy coding and reconstruction dependencies are not allowed across a tile boundary. This includes motion-vector prediction, intra prediction, and context selection. (In-loop filtering is the only exception which is allowed across the boundaries but can be disabled by a flag in the bit-stream.) In addition, to allow the base layer to be decoded independently, encoder-side constraints for temporal motion constrained tiles (MCTS) are needed and temporal motion-constrained-tile sets supplemental enhancement information (SEI) messaging is required. For bitstream extraction and conformance purposes, motion-constrained tile sets extraction information sets SEI message is needed. The drawback of tile definition in HEVC, particularly with independently decoding capability, is loss of coding efficiency.

In an alternative implementation, HEVC allows canvas scalability using a pan-scan rectangle SEI message to extract a region of interest (ROI). SEI messaging specifies the rectangle area, but it does not provide information or constraints that enable the ROI to be decoded independently from other regions. Typically, the decoder needs to decode the full image to get the ROI.

Figure 2B:
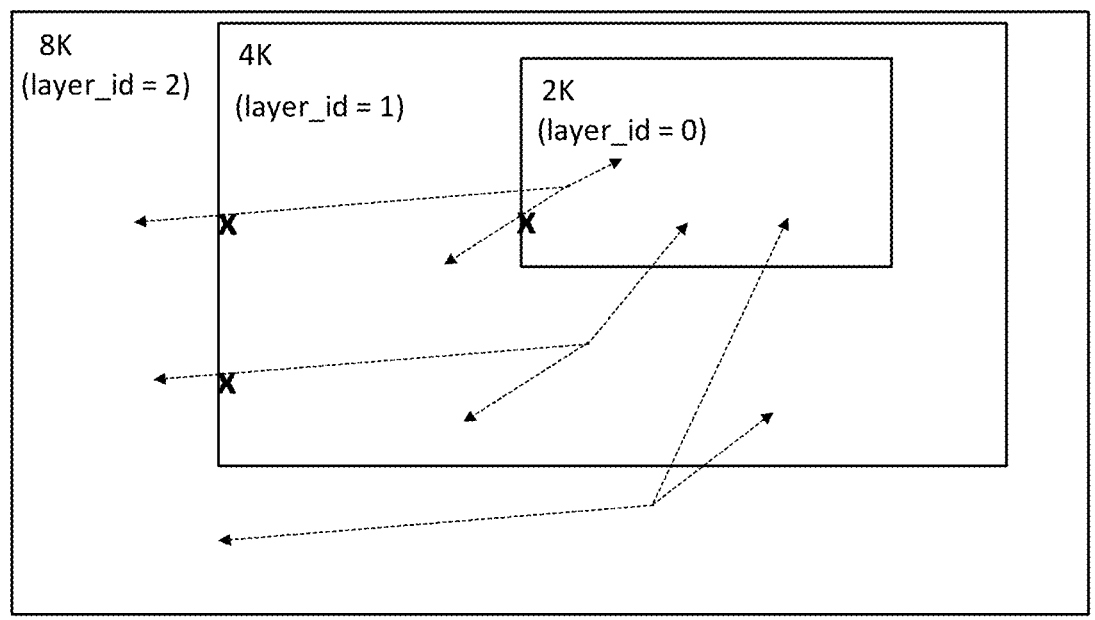
FIG. 2B depicts an example of cross-boundary limitations in a tile representation according to an embodiment.

In an embodiment a novel solution is proposed by improving upon the HEVC tile concept. For example, given the regions depicted in FIG. 2A, in an embodiment, independent decoding is only required for region 2K (215). As illustrated in FIG. 2B, for tiles within 2K, the proposed method allows cross-boundary prediction (intra/inter) and entropy coding. For 4K, it allows cross-boundary prediction (intra/inter) and entropy coding from 2K and within 4K. For 8K, it allows cross-boundary prediction (intra/inter) and entropy coding from 2K and 4K and within 8K. What is proposed here is to assign layer_id 0 to 2K, layer_id 1 to 4K, and layer_id 2 to 8K. Given a current decoding layer_id=N, tile cross boundary prediction and entropy coding is only allowed from layer_id smaller than or equal to N. In this case, loss of coding efficiency is reduced compared to HEVC-style tiles. An example syntax is shown below in Tables 1 and 2 where the proposed new syntax elements over the proposed Versatile Video Codec (VVC) draft specification in Ref.[2] are depicted in an Italic font.

TABLE 1

Example Sequence parameter set RBSP syntax to enable canvas resizing

|  | Descriptor |
| --- | --- |
| seq_parameter_set_rbsp( ) { |  |
|   sps_max_sub_layers_minus1 | u(3) |
|   sps_reserved_zero_5bits | u(5) |
|   profile_tier_level( sps_max_sub_layers_minus1 ) |  |
|   sps_seq_parameter_set_id | ue(v) |
|   ... |  |
|   *sps_canvas_tile_enabled_flag* | *u(1)* |
|   ... |  |
|   sps_extension_flag | u(1) |

TABLE 1-continued

Example Sequence parameter set RBSP syntax to enable canvas resizing

|  | Descriptor |
| --- | --- |
|   if( sps_extension_flag ) |  |
|     while( more_rbsp_data( ) ) |  |
|       sps_extension_data_flag | u(1) |
|   rbsp_trailing_bits( ) |  |
| } |  |

TABLE 2

Example Picture parameter RBSP syntax for canvas resizing

|  | Descriptor |
| --- | --- |
| pic_parameter_set_rbsp( ) { |  |
|   pps_pic_parameter_set_id | ue(v) |
|   pps_seq_parameter_set_id | ue(v) |
|   single_tile_in_pic_flag | u(1) |
|   if( !single_tile_in_pic_flag ) { |  |
|     num_tile_columns_minus1 | ue(v) |
|     num_tile_rows_minus1 | ue(v) |
|     uniform_tile_spacing_flag | u(1) |
|     if( !uniform_tile_spacing_flag ) { |  |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|     } |  |
|     *if( sps_canvas_tile_enabled_flag )* |  |
|       *for( i = 0; i < NumTilesInPic; i++ )* |  |
|         *tile_layer_id[ i ]* | *ue(v)* |
|     loop_filter_across_tiles_enabled_flag | u(1) |
|   } |  |
|   ... | se(v) |
|   rbsp_trailing_bits( ) |  |
| } |  |

In SPS (Table 1), the flag sps_canvas_tile_enabled_flag is added. sps_canvas_tile_enabled_flag equal to 1 specifies that canvas tile is enabled in the current CVS. sps_canvas_tile_enabled_flag equal to 0 specifies that canvas tile is not enabled in the current CVS.

In PPS (Table 2), a new layer_id information parameter, tile_layer_id[i], specifies the layer id for the i-th canvas tile. If one restricts the tile_layer_id values to be consecutive, starting at 0, then, in an embodiment, according to the proposed VVC working draft (Ref. [2]), the maximum possible value of tile_layer_id would be NumTilesInPic−1.

Though tiles are used as an illustration, "bricks," slices, and sub-pictures, as defined in VVC and known in the art, can also be configured in a similar way.

Layer-Adaptive Slice Addressing

As appreciated by the inventors, in certain streaming applications the following features may be desirable:

1) When using network abstraction layer (NAL) units in a video coding layer (VCL), a 2K-resolution bitstream should be self-contained and all its NAL units must have the same value of nuh_layer_id (say, layer 0). An additional bitstream to enable 4K-resolution should also be self-contained and its NAL units must have the same value of nuh_layer_id (say, layer 1), but different than the nuh_layer_id of the 2K layer. Finally, any additional bitstream to enable 8K-resolution should also be self-contained, and its NAL units must have the same value of nuh_layer_id (say, layer 2), but different than the nuh_layer_id values of the 2K and 4K layers. Thus, by analyzing the NAL unit header, using the nuh_layer_id, one should be able to extract the bitstream with the targeted resolution or region(s) of interest (e.g., 2K, 4K, or 8K).

2) For Non-VCL NAL units, the stream and picture parameter set-headers (e.g., SPS, PPS, etc.) should be self-contained for each resolution.

3) For the target resolution, the bitstream extraction process should be able to discard NAL units which are not needed for the target resolution. After bitstream extraction for the target resolution, the bitstream will conform to a single-layer profile, therefore the decoder can simply decode a single resolution bitstream.

Note that the 2K, 4K, and 8K resolutions are only provided as an example, without limitation, and one should be able to apply the same methodology to any number of distinct spatial resolutions or regions of interest. For example, starting with a picture in the highest possible resolution (e.g., res_layer[0]=8K), one may define sub-layers or region of interests at lower resolutions where res_layer[i]>res_layer[i+1], for i=1, 2, ..., N-1, where N denotes the total number of layers. Then, one would like to decode a particular sub-layer without decoding the whole picture first. This can help a decoder reduce complexity, saving power, etc.

To meet the above requirements, in an embodiment, the following methodology is proposed:

In high-level syntax, one can re-use the video parameter set (VPS) syntax to specify the layer information, including the number of layers, the dependency relationship between the layers, the representation format of the layers, DPB sizes, and other information that is related to defining the conformance of the bitstream, including layer sets, output layer sets, profile tier levels, and timing-related parameters.

For signal parameter sets (SPS) associated with each different layer, the picture resolution, conformance window, sub-pictures, etc., should be compliant with the distinct resolutions (e.g., 2K, 4K, or 8K).

For picture parameter sets (PPSs) associated with each different layer, the tile, brick, slice, etc., information should be compliant with the distinct resolutions (e.g., 2K, 4K, or 8K). If distinct regions are set to be the same within a CVS, the tile/brick/slice information may be set in SPS too.

For slice headers, slice_address should be set to the lowest targeted resolution which includes the slice.

As discussed earlier, for independent layer decoding, during prediction, a layer can use tile/brick/slice neighboring information only from lower layers and/or the same layer.

VVC (Ref. [2]) defines as a slice an integer number of bricks of a picture that are exclusively contained in a single NAL unit. A brick is defined as a rectangular region of CTU rows within a particular tile in a picture. A CTU (coding tree unit) is a block of samples with luma and chroma information.

In our 2K/4K/8K example, in an embodiment, the value of slice_address (which denotes the slice address of a slice), for the 2K bitstream may need to have a different slice_address value than that for the 4K bitstream or the 8K bitstream. So translation of slice_address from a lower resolution to higher resolution may be needed. Therefore, in an embodiment such information is provided at the VPS layer.

Figure 2C:
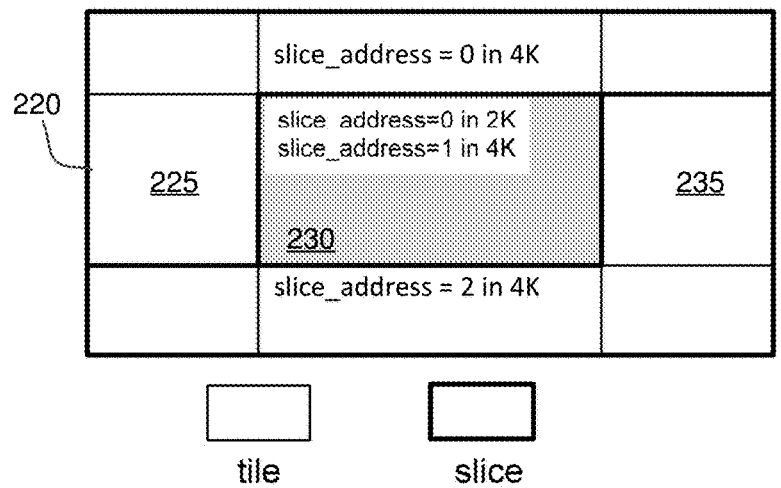
FIG. 2C depicts an example of layer-adaptive slice addressing according to an embodiment.

FIG. 2C depicts such an example for a 4K picture with one sub-layer (e.g, the 2K and 4K case). Consider a picture (220) which has nine tiles and three slices. Let the tile in gray specify the region for 2K resolution. For the 2K bitstream, the slice_address for the grayed region should be 0; however, for the 4K bitstream, the slice_address for the gray region should be 1. A proposed new syntax allows to specify the slice_address according to the resolution layer. For example, in VPS, for nul_layer_id=1, one may add slice_address translation information to specify that in 4K case, the slice_address is modified to be 1. To make implementation simple, in an embodiment, one may want to restrict that slice information for each resolution should be kept the same within a coded video stream (CVS). An example syntax in VPS, based on the HEVC video parameter set RBSP syntax (Section 7.3.2.1 in Ref.[1]) is shown in Table 3. The information can also be carried through other layers of high-level syntax (HLS), such as SPS, PPS, slice header and SEI messages.

TABLE 3

Example syntax in VPS supporting layer-adaptive slice addressing

| | Descriptor |
| --- | --- |
| video_parameter_set_rbsp( ) { | |
|   vps_video_parameter_set_id | u(4) |
|   vps_max_layers_minus1 | u(8) |
|   vps_layer_slice_info_present_flag | u(1) |
|   for( i = 0; i <= vps_max_layers_minus1; i++ ) { | |
|     vps_included_layer_id[ i ] | u(7) |
|     if ( vps_layer_slice_info_present_flag ) { | u(1) |
|       num_slices_in_layer_minus1[ i ] | ue(v) |
|       for ( j = 0; j < i; j++ ) | |
|         for ( k = 0; k < = num_slices_in_layer_minus1[ j ] ) | |
|           layer_slice_address[ i ][ j ][ k ] | u(v) |
|     } | |
|     vps_reserved_zero_bit | u(1) |
|   } | |
|   vps_constraint_info_present_flag | u(1) |
|   vps_reserved_zero_7bits | u(7) |
|   if( vps_constraint_info_present_flag) | |
|     general_constraint_info( ) | |
|   vps_extension_flag | u(1) |
|   if( vps_extension_flag) | |
|     while( more_rbsp_data( )) | |
|       vps_extension_data_flag | u(1) |
|   rbsp_trailing_bits( ) | |
| } | | vps_layer_slice_info_present_flag equal to 1 specifies that slice information is present in the VPS( ) syntax structure. vps_layer_slice_info_present_flag equal to 0 specifies that slice information is not present in the VPS( ) syntax structure.

num_slices_in_layer_minus1[i] specifies plus 1 specifies the number of slices in i-th layer. The value of num_slices_in_layer_minus1[i] are equal to num_slices_in_pic_minus1 in the i-th layer.

layer_slice_address[i][j][k] specifies the targeted i-th layer slice address for the k-th slice in j-th layer.

As an example, returning to the example of FIG. 2C, picture 220 includes two layers:

In layer 0 (say 2K), there is one slice 230 (in gray) with slice address 0

In layer 1 (say 4K), there are three slices (225, 230, and 235) with slices addresses 0, 1, and 2

When decoding layer 1 (i=1), in layer 0 (j=0), slice 0 (k=0) (230) should have slice address 1, thus, following the notation in Table 3, layer_slice_address[1][0][0]=1.

Post-Filtering SEI Messaging

When using Bricks/Tiles/Slices/Sub-pictures to implement canvas scalability, a potential issue is the implementation of in-loop filtering (e.g., deblocking, SAO, ALF) across boundaries. As an example, Ref. [4] describes the problem when a composition window is coded using independent regions (or sub-pictures). When encoding a full picture using independent coded regions (which, as an example, can be implemented by Bricks/Tiles/Slices/Sub-pictures, etc.), in-loop filtering across independently coded regions can cause drift and boundary artifacts. For the canvas size application, it is important to have good visual quality for both high resolution video and low resolution video. For high resolution video, boundary artifacts should be alleviated, therefore in-loop filtering (especially deblocking filter) across independently coded region should be enabled. For low resolution video, drift and boundary artifact should be minimized too.

In Ref. [4], a solution is proposed to extend sub-picture boundary paddings for inter-prediction. This approach can be implemented by an encoder-only constraint to disallow motion vectors which use those pixels affected by in-loop filtering. Alternatively, in an embodiment, it is proposed to address this issue using post filtering which is communicated to a decoder via SEI messaging.

First, it is proposed that in-loop filtering across independently coded regions (e.g., slice boundary in regions 225 and 230) should be disabled. The filtering across independently coded regions for full pictures may be done in post-filtering process. The post-filtering can include one or more of deblocking, SAO, ALF, or other filters. Deblocking might be the most important filter to remove ROI boundary artefacts. In general, a decoder or display/user can have their own choice of what filter to be used. Table 4 depicts an example syntax for SEI messaging for ROI-related post filtering.

TABLE 4

Example syntax for ROI-related post-filtering

| | Descriptor |
|---|---|
| independent_ROI_across_boundary_filter ( payloadSize ) { | |
|   deblocking_enabled_flag | u(1) |
|   sao_enabled_flag | u(1) |
|   alf_enabled_flag | u(1) |
|   user_defined_filter_enabled_flag | u(1) |
| } | |

As an example, the syntax parameters may be defined as follows:

deblocking_enabled_flag equal to 1 specifies that the deblocking process may be applied to the independent ROI boundary of the reconstructed picture for display purposes. deblocking_enabled_flag equal to 0 specifies that the deblocking process may not be applied to the independent ROI boundary of the reconstructed picture for display purposes.

sao_enabled_flag equal to 1 specifies that the sample adaptive offset (SAO) process may be applied to the independent ROI boundary of the reconstructed picture for display purposes. sao_enabled_flag equal to 0 specifies that the sample adaptive process may not be applied to the independent ROI boundary of the reconstructed picture for display purposes.

alf_enabled_flag equal to 1 specifies that the adaptive loop filter process (ALF) may be applied to the independent ROI boundary of the reconstructed picture for display purposes. alf_enabled_flag equal to 0 specifies that the adaptive loop filter process may not be applied to the independent ROI boundary of the reconstructed picture for display purposes.

user_defined_filter_enabled_flag equal to 1 specifies that the user defined filter process may be applied to the independent ROI boundary of the reconstructed picture for display purposes. user_defined_filter_enabled_flag equal to 0 specifies that the user defined filter process may not be applied to the independent ROI boundary of the reconstructed picture for display purposes.

In an embodiment, the SEI messaging in Table 4 can be simplified by removing one or more of the proposed flags. If all flags are removed, then the mere presence of the SEI message independent_ROI_across_boundary_filter (payloadSize) { } will indicate to a decoder that a post filter should be used to mitigate ROI-related boundary artefacts.

Region of Interest (ROI) Scalability

Figure 3:
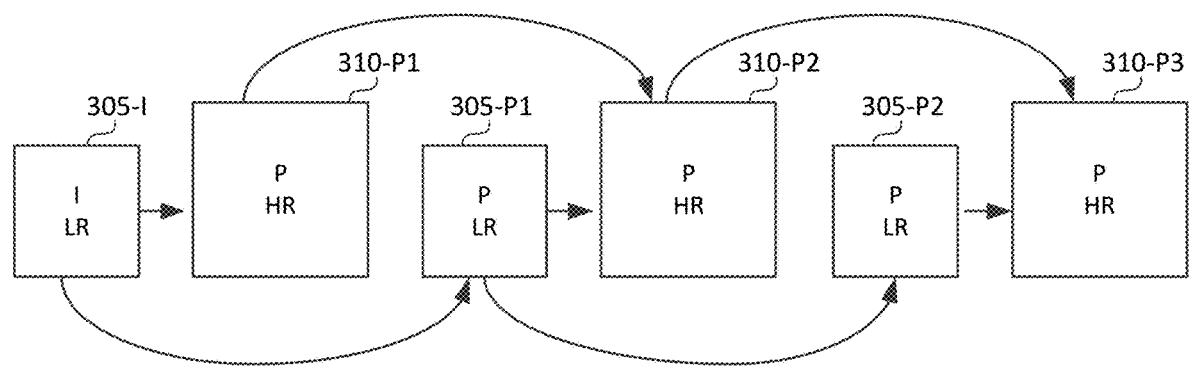
FIG. 3 depicts an example of spatial scalability according to prior art.

The latest specification of VVC (Ref. [2]) describes spatial, quality, and view scalability using a combination of reference picture resampling (RPR) and reference picture selection (RPS), as discussed in more detail in Ref. [3]. It is based on single-loop decoding and block-based, on-the-fly, resampling. RPS is used to define prediction relationships between a base layer and one or more enhancement layers, or, more specifically, among coded pictures which are assigned to either a base layer or one or more enhancement layer(s). RPR is used to code a subset of the pictures, namely those of the spatial enhancement layer(s), at a resolution higher/smaller than the base layer while predicting from the smaller/higher base layer pictures. FIG. 3 depicts an example of spatial scalability according to the RPS/RPR framework.

As depicted in FIG. 3, the bitstream includes two streams, a low-resolution (LR) stream (305) (e.g., standard definition, HD, 2K, and the like) and a higher-resolution (HR) stream, 310, (e.g., HD, 2K, 4K, 8K, and the like). Arrows denote possible inter-coding dependencies. For example, HR frame 310-P1 depends on LR frame 305-I. To predict blocks in 310-P-1, a decoder will need to up-scale 305-I. Similarly, HR frame 310-P2 may depend on HR frame 310-P1 and LR frame 305-P1. Any predictions from LR frame 305-P1 will require a spatial up-scaling from LR to HR. In other embodiments, the order of LR and HR frames could also be reversed, thus the base layer could be the HR stream and the enhancement layer could be the LR stream. It is noted that the scaling of a base-layer picture is not performed explicitly as in SHVC. Instead, it is absorbed in inter-layer motion compensation and computed on-the-fly. In Ref. [2], the scalability ratio is implicitly derived using a cropping window.

ROI scalability is being supported in HEVC (Ref. [1]) as part of Annex H "Scalable high efficiency video coding," commonly referred to as SHVC. For example, in Section F.7.3.2.3.4, syntax elements related to scaled_ref_layer_offset_present_flag[i] and ref_region_offset_present_flag[i] are defined. Related parameters are derived in equations (H-2) to (H-21) and (H-67) to (H-68). VVC does not yet support region of interest (ROI) scalability. As appreciated by the inventors, support for ROI scalability could enable canvas-size scalability using the same, single-loop, VVC decoder, without the need for scalability extensions as in SHVC.

Figure 4:
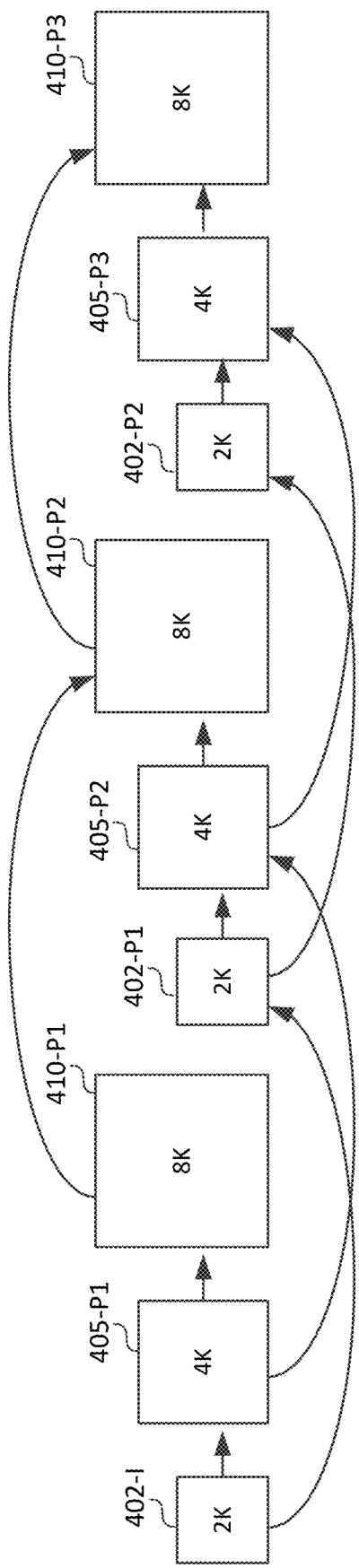
FIG. 4 depicts an example of canvas scalability according to an embodiment.

As an example, given the three layers of data depicted in FIG. 2B (e.g., 2K, 4K, and 8K), FIG. 4 depicts an example embodiment of a bitstream that supports canvas-size scalability using the existing RPS/RPR framework.

As depicted in FIG. 4, the bitstream allocates its pictures into three layers or streams, a 2K stream (402), a 4K stream (405), and an 8K stream (410). Arrows denote examples of possible inter-coding dependencies. For example, pixel blocks in 8K frame 410-P2 may depend on blocks in 8K frame 410-P1, 4K frame 405-P2, and 2K frame 402-P1. Compared to prior scalability schemes that were using multiple-loop decoders, the proposed ROI scalability scheme has the following advantages and disadvantages:

Advantages: Requires a single-loop decoder and does not require any other tools. A decoder needs not to be concerned on how to handle brick/tile/slice/sub-picture boundary issues.

Disadvantages: To decode an enhancement layer, both the base layer and the enhancement layer decoded pictures are needed in the decoded picture buffer (DPB), therefore requiring a larger DPB size than a non-scalable solution. It may also require higher decoder speed because both the base layer and enhancement layer need to be decoded.

A key difference in enabling ROI scalability support between SHVC and proposed embodiments for VVC is that in SHVC the picture resolution is required to be the same for all pictures in the same layer. But in VVC, due to the RPR support, pictures in the same layer may have different resolutions. For example, in FIG. 3, in SHVC, 305-I, 305-P1 and 305-P2 require to have the same spatial resolution. But in VVC, due to RPR support, 305-I, 305-P1 and 305-P2 can have different resolutions. For example, 305-I and 305-P1 can have a first low resolution (say, 720p), while 305-P2 can have a second low resolution (say, 480p). Embodiments of this invention aim at supporting both ROI scalability across different layers and RPR for pictures of the same layer. Another major difference is that in SHVC the motion vector from inter-layer prediction is constrained to be zero. But for VVC, such constraint does not exist, and a motion vector can be zero or non-zero. This reduces the constraints for identifying inter-layer correspondence.

The coding tree of VVC only allows coding of full coding units (CUs). While most standard formats code picture regions in multiples of four or eight pixels, non-standard formats may require a padding at the encoder to match the minimum CTU size. The same problem existed in HEVC. It was solved by creating a "conformance window," which specifies the picture area that is considered for conforming picture output. A conformance window was also added in VVC (Ref. [2]) and it is specified via four variables: conf_win_left_offset, conf_win_right_offset, conf_win_top_offset, and conf_win_bottom_offset. For ease of reference, the following section is copied from Ref [2].

"conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

$$PicOutputWidthL=pic\_width\_in\_luma\_samples-SubWidthC*(conf\_win\_right\_offset+conf\_win\_left\_offset) \quad (7\text{-}43)$$

$$PicOutputHeightL=pic\_height\_in\_pic\_size\_units-SubHeightC*(conf\_win\_bottom\_offset+conf\_win\_top\_offset)" \quad (7\text{-}44)$$

Figure 5:
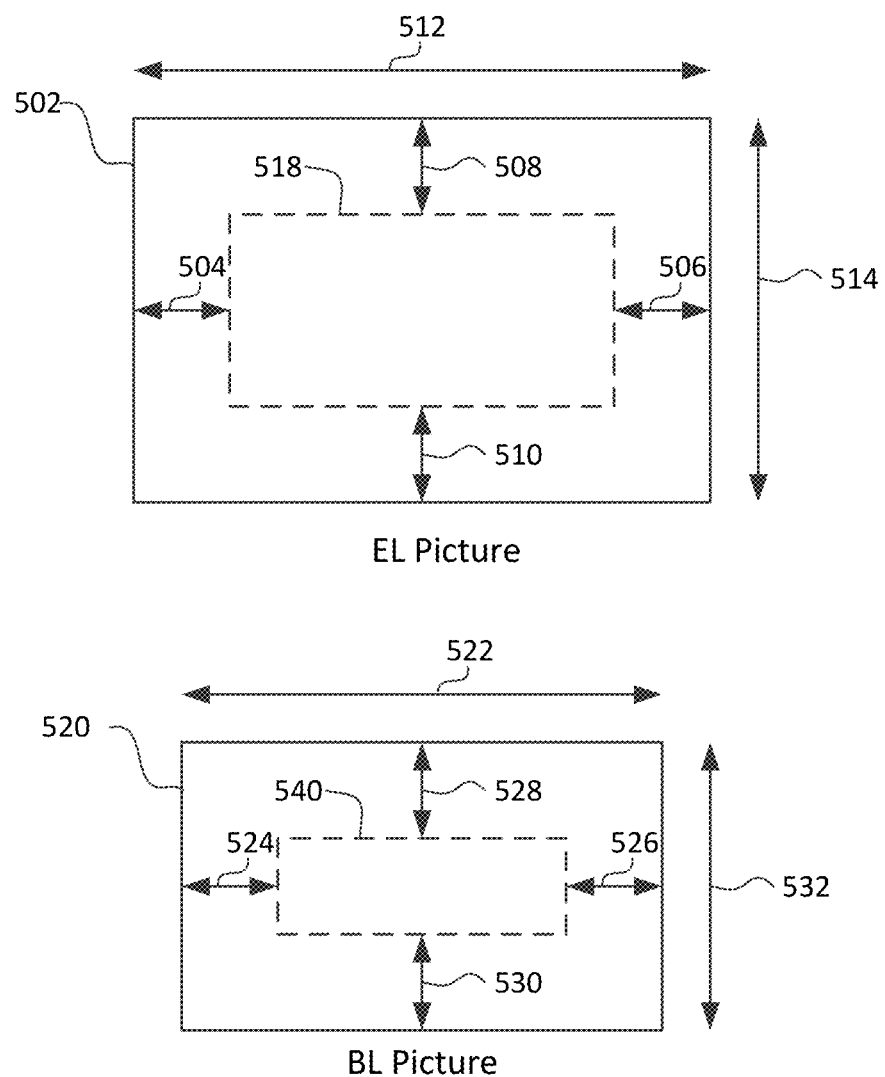
FIG. 5 depicts an example of a base layer and an enhancement layer picture and corresponding conformance windows according to an embodiment.

In a first embodiment, newly defined ROI offsets are combined with existing offsets of the conformance window to derive the scaling factors. An example embodiment of proposed syntax elements is depicted in FIG. 5 which depicts a base layer picture (520) and an enhancement layer picture (502) with their corresponding conformance windows. The following ROI syntax elements are defined:

Base Layer (BL)
  ref_region_top_offset (528)
  ref_region_bottom_offset (530)
  ref_region_left_offset (524)
  ref_region_right_offset (526)

Note that the width (522) and the height (532) of the BL picture (520) can be computed using the conformance window parameters of the base layer using equations (7-43) and (7-44) above. (E.g., pic_width_in_luma_samples may correspond to width 522 and PicOutputWidth may correspond to the width of the dotted window 540).

Enhancement Layer
  scaled_ref_region_top_offset (508)
  scaled_ref_region_bottom_offset (510)
  scaled_ref_region_left_offset (504)
  scaled_ref_region_right_offset (506)

Note that the width (512) and the height (514) of the EL picture (502) can be computed using the conformance window parameters of the enhancement layer using equations (7-43) and (7-44) above. (E.g., pic_width_in_luma_samples may correspond to width 512 and PicOutputWidth may correspond to the width of the dotted window 518).

As an example, Table 5 shows how the pic_parameter_set_rbsp( ), defined in Section 7.3.2.4 of Ref. [2], could be modified (edits are in Italics) to support the new syntax elements.

TABLE 5

Example syntax to support ROI scalability in VVC

|  | Descriptor |
| --- | --- |
| pic_parameter_set_rbsp( ) { |  |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |

TABLE 5-continued

Example syntax to support ROI scalability in VVC

| | Descriptor |
|---|---|
| if( conformance_window_flag) { | |
|    conf_win_left_offset | ue(v) |
|    conf_win_right_offset | ue(v) |
|    conf_win_top_offset | ue(v) |
|    conf_win_bottom_offset | ue(v) |
| } | |
| num_ref_loc_offsets | ue(v) |
| for( i = 0; i < num_ref_loc_offsets; i++ ) { | |
|    ref_loc_offset_layer_id[ i ] | u(6) |
|    scaled_ref_layer_offset_present_flag[ i ] | u(1) |
|    if( scaled_ref_layer_offset_present_flag[ i ] ) { | |
|      scaled_ref_layer_left_offset[ ref_loc_offset_layer_id[ i ] ] | se(v) |
|      scaled_ref_layer_top_offset[ ref_loc_offset_layer_id[ i ] ] | se(v) |
|      scaled_ref_layer_right_offset[ ref_loc_offset_layer_id[ i ] ] | se(v) |
|      scaled_ref_layer_bottom_offset[ ref_loc_offset_layer_id[ i ] ] | se(v) |
|    } | |
|    ref_region_offset_present_flag[ i ] | u(1) |
|    if( ref_region_offset_present_flag[ i ] ) { | |
|      ref_region_left_offset[ ref_loc_offset_layer_id[ i ] ] | se(v) |
|      ref_region_top_offset[ ref_loc_offset_layer_id[ i ] ] | se(v) |
|      ref_region_right_offset[ ref_loc_offset_layer_id[ i ] ] | se(v) |
|      ref_region_bottom_offset[ ref_loc_offset_layer_id[ i ] ] | se(v) |
|    } | |
| } | | num_ref_loc_offsets specifies the number of reference layer location offsets that are present in the PPS. The value of num_ref_loc_offsets shall be in the range of 0 to vps_max_layers_minus1, inclusive.

ref_loc_offset_layer_id[i] specifies the nuh_layer_id value for which the i-th reference layer location offset parameters are specified.

NOTE—ref_loc_offset_layer_id[i] need not be among the direct reference layers, for example when the spatial correspondence of an auxiliary picture to its associated primary picture is specified.

The i-th reference layer location offset parameters consist of the i-th scaled reference layer offset parameters, and the i-th reference region offset parameters.

scaled_ref_layer_offset_present_flag[i] equal to 1 specifies that the i-th scaled reference layer offset parameters are present in the PPS. scaled_ref_layer_offset_present_flag[i] equal to 0 specifies that the i-th scaled reference layer offset parameters are not present in the PPS. When not present, the value of scaled_ref_layer_offset_present_flag[i] is inferred to be equal to 0.

The i-th scaled reference layer offset parameters specify the spatial correspondence of a picture referring to this PPS relative to the reference region in a decoded picture with nuh_layer_id equal to ref_loc_offset_layer_id[i].

scaled_ref_layer_left_offset[ref_loc_offset_layer_id[i]] plus conf_win_left_offset specifies the horizontal offset between the sample in the current picture that is collocated with the top-left luma sample of the reference region in a decoded picture with nuh_layer_id equal to ref_loc_offset_layer_id[i] and the top-left luma sample of the current picture in units of subVVC luma samples, where subVVC is equal to the SubWidthC of the picture that refers to this PPS. The value of scaled_ref_layer_left_offset[ref_loc_offset_layer_id[i]] plus conf_win_left_offset shall be in the range of $-2^{14}$ to $2^{14}-1$, inclusive. When not present, the value of scaled_ref_layer_left_offset[ref_loc_offset_layer_id[i]] is inferred to be equal to 0.

scaled_ref_layer_top_offset[ref_loc_offset_layer_id[i]] plus conf_win_top_offset specifies the vertical offset between the sample in the current picture that is collocated with the top-left luma sample of the reference region in a decoded picture with nuh_layer_id equal to ref_loc_offset_layer_id[i] and the top-left luma sample of the current picture in units of subHC luma samples, where subHC is equal to the SubHeightC of the picture that refers to this PPS. The value of scaled_ref_layer_top_offset[ref_loc_offset_layer_id[i]] plus conf_win_top_offsetshall be in the range of $-2^{14}$ to $2^{14}-1$, inclusive. When not present, the value of scaled_ref_layer_top_offset[ref_loc_offset_layer_id[i]] is inferred to be equal to 0.

scaled_ref_layer_right_offset[ref_loc_offset_layer_id[i]] plus conf_win_right_offsetspecifies the horizontal offset between the sample in the current picture that is collocated with the bottom-right luma sample of the reference region in a decoded picture with nuh_layer_id equal to ref_loc_offset_layer_id[i] and the bottom-right luma sample of the current picture in units of subVVC luma samples, where subVVC is equal to the SubWidthC of the picture that refers to this PPS. The value of scaled_ref_layer_right_offset[ref_loc_offset_layer_id[i]] plus conf_win_right_offset shall be in the range of $-2^{14}$ to $2^{14}-1$, inclusive. When not present, the value of scaled_ref_layer_right_offset[ref_loc_offset_layer_id[i]] is inferred to be equal to 0.

scaled_ref_layer_bottom_offset[ref_loc_offset_layer_id[i]] plus conf_win_bottom_offset specifies the vertical offset between the sample in the current picture that is collocated with the bottom-right luma sample of the reference region in a decoded picture with nuh_layer_id equal to ref_loc_offset_layer_id[i] and the bottom-right luma sample of the current picture in units of subHC luma samples, where subHC is equal to the SubHeightC of the picture that refers to this PPS. The value of scaled_ref_layer_bottom_offset[ref_loc_offset_layer_id[i]] plus conf_win_bottom_offset shall be in the range of $-2^{14}$ to $2^{14}-1$, inclusive. When not present, the value of scaled_ref_layer_bottom_offset[ref_loc_offset_layer_id[i]] is inferred to be equal to 0.

Let currTopLeftSample, currBotRightSample, colRefRegionTopLeftSample and colRefRegionBotRightSample be the top-left luma sample of the current picture, the bottom-right luma sample of the current picture, the sample in the current picture that is collocated with the top-left luma sample of the reference region in a decoded picture with nuh_layer_id equal to ref_loc_offset_layer_id[i], and the sample in the current picture that is collocated with the bottom-right luma sample of the reference region in the decoded picture with nuh_layer_id equal to ref_loc_offset_layer_id[i], respectively.

When the value of (scaled_ref_layer_left_offset[ref_loc_offset_layer_id[i]]+conf_win_left_offset) is greater than 0, colRefRegionTopLeftSample is located to the right of currTopLeftSample. When the value of (scaled_ref_layer_left_offset[ref_loc_offset_layer_id[i]]+conf_win_left_offset) is less than 0, colRefRegionTopLeftSample is located to the left of currTopLeftSample.

When the value of (scaled_ref_layer_top_offset[ref_loc_offset_layer_id[i]]+conf_win_top_offset) is greater than 0, colRefRegionTopLeftSample is located below currTopLeftSample. When the value of ( scaled_ref_layer_top_offset[ref_loc_offset_layer_id[i]]+conf_win_top_offset) is less than 0, colRefRegionTopLeftSample is located above currTopLeftSample.

When the value of (scaled_ref_layer_right_offset[ref_loc_offset_layer_id[i]]+conf_win_right_offset) is greater than 0, colRefRegionBotRightSample is located to the left of currBotRightSample. When the value of (scaled_ref_layer_right_offset[ref_loc_offset_layer_id[i]]+conf_win_right_offset) is less than 0, colRefRegionTopLeftSample is located to the right of currBotRightSample.

When the value of (scaled_ref_layer_bottom_offset[ref_loc_offset_layer_id[i]]+conf_win_bottom_offset) is greater than 0, colRefRegionBotRightSample is located above currBotRightSample. When the value of (scaled_ref_layer_bottom_offset[ref_loc_offset_layer_id[i]]+conf_win_bottom_offset) is less than 0, colRefRegionTopLeftSample is located below currBotRightSample.

ref_region_offset_present_flag[i] equal to 1 specifies that the i-th reference region offset parameters are present in the PPS. ref_region_offset_present_flag[i] equal to 0 specifies that the i-th reference region offset parameters are not present in the PPS. When not present, the value of ref_region_offset_present_flag[i] is inferred to be equal to 0.

The i-th reference region offset parameters specify the spatial correspondence of the reference region in the decoded picture with nuh_layer_id equal to ref_loc_offset_layer_id[i] relative to the same decoded picture.

Let refConfLeftOffset[ref_loc_offset_layer_id[i]], refConfTopOffset[ref_loc_offset_layer_id[i]], refConfRightOffset[ref_loc_offset_layer_id[i]] and refConfBottomOffset[ref_loc_offset_layer_id[i]] be the value of conf_win_left_offset, conf_win_top_offset, conf_win_right_offset and conf_win_bottom_offset of the decoded picture with nuh_layer_id equal to ref_loc_offset_layer_id[i], respectively.

ref_region_left_offset[ref_loc_offset_layer_id[i]] plus refConfLeftOffset[ref_loc_offset_layer_id[i]] specifies the horizontal offset between the top-left luma sample of the reference region in the decoded picture with nuh_layer_id equal to ref_loc_offset_layer_id[i] and the top-left luma sample of the same decoded picture in units of subVVC luma samples, where subVVC is equal to the SubWidthC of the layer with nuh_layer_id equal to ref_loc_offset_layer_id[i]. The value of ref_region_left_offset[ref_loc_offset_layer_id[i]] plus refConfLeftOffset[ref_loc_offset_layer_id[i]] shall be in the range of $-2^{14}$ to $2^{14}-1$, inclusive. When not present, the value of ref_region_left_offset[ref_loc_offset_layer_id[i]] is inferred to be equal to 0.

ref_region_top_offset[ref_loc_offset_layer_id[i]] plus refConfTopOffset[ref_loc_offset_layer_id[i]] specifies the vertical offset between the top-left luma sample of the reference region in the decoded picture with nuh_layer_id equal to ref_loc_offset_layer_id[i] and the top-left luma sample of the same decoded picture in units of subHC luma samples, where subHC is equal to the SubHeightC of the layer with nuh_layer_id equal to ref_loc_offset_layer_id[i]. The value of ref_region_top_offset[ref_loc_offset_layer_id[i]] plus refConfTopOffset[ref_loc_offset_layer_id[i]] shall be in the range of $-2^{14}$ to $2^{14}-1$, inclusive. When not present, the value of ref_region_top_offset[ref_loc_offset_layer_id[i]] is inferred to be equal to 0.

ref_region_right_offset[ref_loc_offset_layer_id[i]] plus refConfRightOffset[ref_loc_offset_layer_id[i]] specifies the horizontal offset between the bottom-right luma sample of the reference region in the decoded picture with nuh_layer_id equal to ref_loc_offset_layer_id[i] and the bottom-right luma sample of the same decoded picture in units of subVVC luma samples, where subVVC is equal to the SubWidthC of the layer with nuh_layer_id equal to ref_loc_offset_layer_id[i]. The value of ref_layer_right_offset[ref_loc_offset_layer_id[i]] plus refConfRightOffset[ref_loc_offset_layer_id[i]] shall be in the range of $-2^{14}$ to $2^{14}-1$, inclusive. When not present, the value of ref_region_right_offset[ref_loc_offset_layer_id[i]] is inferred to be equal to 0.

ref_region_bottom_offset[ref_loc_offset_layer_id[i]] plus refConfBottomOffset[ref_loc_offset_layer_id[i]] specifies the vertical offset between the bottom-right luma sample of the reference region in the decoded picture with nuh_layer_id equal to ref_loc_offset_layer_id[i] and the bottom-right luma sample of the same decoded picture in units of subHC luma samples, where subHC is equal to the SubHeightC of the layer with nuh_layer_id equal to ref_loc_offset_layer_id[i]. The value of ref_layer_bottom_offset[ref_loc_offset_layer_id[i]] plus refConfBottomOffset[ref_loc_offset_layer_id[i]] shall be in the range of $-2^{14}$ to $2^{14}-1$, inclusive. When not present, the value of ref_region_bottom_offset[ref_loc_offset_layer_id[i]] is inferred to be equal to 0.

Let refPicTopLeftSample, refPicBotRightSample, refRegionTopLeftSample and refRegionBotRightSample be the top-left luma sample of the decoded picture with nuh_layer_id equal to ref_loc_offset_layer_id[i], the bottom-right luma sample of the decoded picture with nuh_layer_id equal to ref_loc_offset_layer_id[i], the top-left luma sample of the reference region in the decoded picture with nuh_layer_id equal to ref_loc_offset_layer_id[i] and the bottom-right luma sample of the reference region in the decoded picture with nuh_layer_id equal to ref_loc_offset_layer_id[i], respectively.

When the value of (ref_region_left_offset[ref_loc_offset_layer_id[i]]+refConfLeftOffset[ref_loc_offset_layer_id[i]]) is greater than 0, refRegionTopLeftSample is located to the right of refPicTopLeftSample. When the value of (ref_region_left_offset[ref_loc_offset_layer_id[i]]+refConfLeftOffset[ref_loc_offset_layer_id[i]]) is less than 0, refRegionTopLeftSample is located to the left of refPicTopLeftSample.

When the value of (ref_region_top_offset[ref_loc_offset_layer_id[i]]+refConfTopOffset[ref_loc_offset_layer_id[i]]) is greater than 0, refRegionTopLeftSample is located below refPicTopLeftSample. When the value of ( ref_region_top_offset[ref_loc_offset_layer_id[i]]+refConfTopOffset[ref_loc_offset_layer_id[i]]) is less than 0, refRegionTopLeftSample is located above refPicTopLeftSample.

When the value of (ref_region_right_offset[ref_loc_offset_layer_id[i]]+refConfRightOffset[ref_loc_offset_layer_id[i]]) is greater than 0, refRegionBotRightSample is located to the left of refPicBotRightSample. When the value of (ref_region_right_offset[ref_loc_offset_layer_id[i]]+refConfRightOffset[ref_loc_offset_layer_id[i]]) is less than 0, refRegionBotRightSample is located to the right of refPicBotRightSample.

When the value of (ref_region_bottom_offset[ref_loc_offset_layer_id[i]]+refConfBottomOffset[ref_loc_offset_layer_id[i]]) is greater than 0, refRegionBotRightSample is located above refPicBotRightSample. When the value of (ref_region_bottom_offset[ref_loc_offset_layer_id[i]]+refConfBottomOffset[ref_loc_offset_layer_id[i]]) is less than 0, refRegionBotRightSample is located below refPicBotRightSample.

Given the proposed syntax elements, in an embodiment and without limitation, the corresponding VVC Section could be amended as follows. Equations marked (7-xx) and (8-xx) denote new equations which need to be inserted to the VVC specification and will be renumbered as needed.

The variable ConfWinLeftOffset, ConfWinRightOffset, ConfWinTopOffset, ConfWinBottomOffset are derived as follows:

$$\text{ConfWinLeftOffset} = \text{SubWidth}C * \text{conf\_win\_left\_offset} \quad (7\text{-}xx)$$

$$\text{ConfWinRightOffset} = \text{SubWidth}C * \text{conf\_win\_right\_offset} \quad (7\text{-}xx)$$

$$\text{ConfWinTopOffset} = \text{SubHeight}C * \text{conf\_win\_top\_offset} \quad (7\text{-}xx)$$

$$\text{ConfWinBottomOffset} = \text{SubHeight}C * \text{conf\_win\_bottom\_offset} \quad (7\text{-}xx)$$

The variables PicOutputWidthL and PicOutputHeightL are derived as follows:

$$\text{PicOutputWidth}L = \text{pic\_width\_in\_luma\_samples} - \text{SubWidth}C * (\text{conf\_win\_right\_offset} + \text{conf\_win\_left\_offset}) \quad (7\text{-}43)$$

$$\text{PicOutputHeight}L = \text{pic\_height\_in\_pic\_size\_units} - \text{SubHeight}C * (\text{conf\_win\_bottom\_offset} + \text{conf\_win\_top\_offset}) \quad (7\text{-}44)$$

The variable fRefWidth is set equal to the PicOutputWidthL of the reference picture in luma samples.
The variable fRefHeight is set equal to PicOutputHeightL of the reference picture in luma samples.
The variable refConfWinLeftOffset is set equal to the ConfWinLeftOffset of the reference picture in luma samples.
The variable refConfWinTopOffset is set equal to the ConfWinTopOffset of the reference picture in luma samples.

If cIdx is equal to 0, the following applies:
 The scaling factors and their fixed-point representations are defined as $$\text{hori\_scale\_fp} = ((f\text{RefWidth} << 14) + (\text{PicOutputWidth}L >> 1)) / \text{PicOutputWidth}L \quad (8\text{-}753)$$

$$\text{vert\_scale\_fp} = ((f\text{RefHeight} << 14) + (\text{PicOutputHeight}L >> 1)) / \text{PicOutputHeight}L \quad (8\text{-}754)$$

Let $(\text{refxSb}_L, \text{refySb}_L)$ and $(\text{refx}_L, \text{refy}_L)$ be luma locations pointed to by a motion vector (refMvLX[0], refMvLX[1]) given in 1/16-sample units. The variables $\text{refxSb}_L$, $\text{refx}_L$, $\text{refySb}_L$, and $\text{refy}_L$ are derived as follows:

$$\text{refxSb}_L = ((x\text{Sb} << 4) + \text{refMvLX}[0]) * \text{hori\_scale\_fp} \quad (8\text{-}755)$$

$$\text{refx}_L = ((\text{Sign}(\text{refxSb}_L) * ((\text{Abs}(\text{refxSb}_L) + 128) >> 8) + x_L * ((\text{hori\_scale\_fp} + 8) >> 4)) + 32) >> 6 \quad (8\text{-}756)$$

$$\text{refySb}_L = ((y\text{Sb} << 4) + \text{refMvLX}[1]) * \text{vert\_scale\_fp} \quad (8\text{-}757)$$

$$\text{refy}_L = ((\text{Sign}(\text{refySb}_L) * ((\text{Abs}(\text{refySb}_L) + 128) >> 8) + y_L * ((\text{vert\_scale\_fp} + 8) >> 4)) + 32) >> 6 \quad (8\text{-}758)$$

Otherwise (cIdx is not equal to 0), the following applies:
 Let $(\text{refxSb}_C, \text{refySb}_C)$ and $(\text{refx}_C, \text{refy}_C)$ be chroma locations pointed to by a motion vector (mvLX[0], mvLX[1]) given in 1/32-sample units. The variables $\text{refxSb}_C$, $\text{refySb}_C$, $\text{refx}_C$ and $\text{refy}_C$ are derived as follows:

$$\text{refxSb}_C = ((x\text{Sb}/\text{SubWidth}C << 5) + \text{mvLX}[0]) * \text{hori\_scale\_fp} \quad (8\text{-}763)$$

$$\text{refx}_C = ((\text{Sign}(\text{refxSb}_C) * ((\text{Abs}(\text{refxSb}_C) + 256) >> 9) + x_C * ((\text{hori\_scale\_fp} + 8) >> 4)) + 16) >> 5 \quad (8\text{-}764)$$

$$\text{refySb}_C = ((y\text{Sb}/\text{SubHeight}C << 5) + \text{mvLX}[1]) * \text{vert\_scale\_fp} \quad (8\text{-}765)$$

$$\text{refy}_C = ((\text{Sign}(\text{refySb}_C) * ((\text{Abs}(\text{refySb}_C) + 256) >> 9) + y_C * ((\text{vert\_scale\_fp} + 8) >> 4)) + 16) >> 5 \quad (8\text{-}766)$$

To support ROI (canvas-size) scalability, the specification should be modified as follows:
The variable ConfWinLeftOffset, ConfWinRightOffset, ConfWinTopOffset, ConfWinBottomOffset are derived as follows:

$$\text{ConfWinLeftOffset} = \text{SubWidth}C * \text{conf\_win\_left\_offset} \quad (7\text{-}xx)$$

$$\text{ConfWinRightOffset} = \text{SubWidth}C * \text{conf\_win\_right\_offset} \quad (7\text{-}xx)$$

$$\text{ConfWinTopOffset} = \text{SubHeight}C * \text{conf\_win\_top\_offset} \quad (7\text{-}xx)$$

$$\text{ConfWinBottomOffset} = \text{SubHeight}C * \text{conf\_win\_bottom\_offset} \quad (7\text{-}xx)$$

The variables PicOutputWidthL and PicOutputHeightL are derived as follows:

$$\text{PicOutputWidth}L = \text{pic\_width\_in\_luma\_samples} - \text{SubWidth}C * (\text{conf\_win\_right\_offset} + \text{conf\_win\_left\_offset}) \quad (7\text{-}43)$$

$$\text{PicOutputHeight}L = \text{pic\_height\_in\_pic\_size\_units} - \text{SubHeight}C * (\text{conf\_win\_bottom\_offset} + \text{conf\_win\_top\_offset}) \quad (7\text{-}44)$$

The variable rLId specifies the value of nuh_layer_id of the direct reference layer picture.
The variables RefLayerRegionLeftOffset, RefLayerRegionTopOffset, RefLayerRegionRightOffset and RefLayerRegionBottomOffset are derived as follows:

$$\text{RefLayerRegionLeftOffset} = \text{ref\_region\_left\_offset}[\text{rLId}] * \text{SubWidthRefLayer}C \quad (7\text{-}xx)$$

$$\text{RefLayerRegionTopOffset} = \text{ref\_region\_top\_offset}[\text{rLId}] * \text{SubHeightRefLayer}C \quad (7\text{-}xx)$$

$$\text{RefLayerRegionRightOffset} = \text{ref\_region\_right\_offset}[\text{rLId}] * \text{SubWidthRefLayer}C \quad (7\text{-}xx)$$

$$\text{RefLayerRegionBottomOffset} = \text{ref\_region\_bottom\_offset}[\text{rLId}] * \text{SubHeightRefLayer}C \quad (7\text{-}xx)$$

The variables ScaledRefLayerLeftOffset, ScaledRefLayerTopOffset, ScaledRefLayerRightOffset and ScaledRefLayerBottomOffset are derived as follows:

$$\text{ScaledRefLayerLeftOffset} = \text{scaled\_ref\_layer\_left\_offset}[\text{rLId}] * \text{SubWidthCurr}C \quad (7\text{-}xx)$$

$$\text{ScaledRefLayerTopOffset} = \text{scaled\_ref\_layer\_top\_offset}[\text{rLId}] * \text{SubHeightCurr}C \quad (7\text{-}xx)$$

$$\text{ScaledRefLayerRightOffset} = \text{scaled\_ref\_layer\_right\_offset}[\text{rLId}] * \text{SubWidthCurr}C \quad (7\text{-}xx)$$

ScaledRefLayerBottomOffset=scaled_ref_layer_bottom_offset
[rLId]*SubHeightCurr$C$ (7-xx)

The variable refConfWinLeftOffset is set equal to the ConfWinLeftOffset of the reference picture in luma samples. The variable refConfWinTopOffset is set equal to the ConfWinTopOffset of the reference picture in luma samples. The variable fRefWidth is set equal to the PicOutputWidthL of the reference picture in luma samples.
The variable fRefHeight is set equal to PicOutputHeightL of the reference picture in luma samples.
The variable fCurWidth is set equal to the PicOutputWidthL of the current picture in luma samples.
The variable fCurHeight is set equal to PicOutputHeightL of the current picture in luma samples.
The variable fRefLeftOffset is set equal to refConfWinLeftOffset.
The variable fRefTopOffset is set equal to refConfWinTopOffset.
The variable fCurLeftOffset is set equal to ConfWinLeftOffset.
The variable fCurTopOffset is set equal to ConfWinTopOffset.
If inter_layer_ref_pic_flag for the reference picture is equal to 1,
/* Find width and height of reference and currents ROI for proper scaling fRefWidth=fRefWidth−RefLayerRegionLeftOffset−
RefLayerRegionRightOffset (8-x1)

fRefHeight=fRefHeight−RefLayerRegionTopOffset−
RefLayerRegionBottomOffset (8-x2)

fCurWidth=fCurWidth−ScaledRefLayerLeftOffset−
ScaledRefLayerRightOffset (8-x3)

fCurHeight=fRefHeight−ScaledRefLayerTopOffset−
ScaledRefLayerBottomOffset (8-x4)

/* Adjust offsets for reference and current for proper pixel correspondence fRefLeftOffset=fRefLeftOffset+RefLayerRegionLeftOffset (8-x5)

fRefTopOffset=fRefTopOffset+RefLayerRegionTopOffset (8-x6)

fCurLeftOffset=fCurLeftOffset+ScaledRefLayerLeftOffset (8-x7)

fCurTopOffset=fCurTopOffset+ScaledRefLayerTopOffset (8-x8)

If cIdx is equal to 0, the following applies:
The scaling factors and their fixed-point representations are defined as hori_scale_fp=((fRefWidth<<14)+(fCurWidth>>1))/
fCurWidth (8-753)

vert_scale_fp=((fRefHeight<<14)+(fCurHeight>>1))/
fCurHeight (8-754)

Let ($refxSb_L$, $refySb_L$) and ($refx_L$, $refy_L$) be luma locations pointed to by a motion vector (refMvLX[0], refMvLX[1]) given in 1/16-sample units. The variables $refxSb_L$, $refx_L$, $refySb_L$, and $refy_L$ are derived as follows:

$refxSb_L$=(((xSb−fCurLeftOffset)<<4)+refMvLX[0])*
hori_scale_fp (8-755)

$refx_L$=((Sign($refxSb_L$)*((Abs($refxSb_L$)+128)>>8)+$x_L$*
((hori_scale_fp+8)>>4))+32)>>6+(fRefLeftOffset<<4) (8-756)

$refySb_L$=(((ySb−fCurTopOffset)<<4)+refMvLX[1])*
vert_scale_fp (8-757)

$refy_L$=((Sign($refySb_L$)*((Abs($refySb_L$)+128)>>8)+
$yL$*((vert_scale_fp+8)>>4))+32)>>6+
(fRefTopOffset<<4) (8-758)

Otherwise (cIdx is not equal to 0), the following applies:
Let ($refxSb_C$, $refySb_C$) and ($refx_C$, $refy_C$) be chroma locations pointed to by a motion vector (mvLX[0], mvLX[1]) given in 1/32-sample units. The variables $refxSb_C$, $refySb_C$, $refx_C$ and $refy_C$ are derived as follows:

$refxSb_C$=(((xSb−fCurLeftOffset)/SubWidth$C$<<5)+
mvLX[0])*hori_scale_fp (8-763)

$refx_C$=((Sign($refxSb_C$)*((Abs(refxSbc)+256)>>9)+
$xC$*((hori_scale_fp+8)>>4))+16)>>5+((fRefLeftOffset/SubWidth$C$)<<5) (8-764)

$refySb_C$=(((ySb−fCurTopOffset)/SubHeight$C$<<5)+
mvLX[1])*vert_scale_fp (8-765)

$refy_C$=((Sign($refySb_C$)*((Abs($refySb_C$)+256)>>9)+
$yC$*((vert_scale_fp+8)>>4))+16)>>5+
((fRefTopOffset/SubHeight$_C$)<<5) (8-766)

In another embodiment, because, unlike SHVC, there is no constraint in VVC on the size of motion vectors during inter-layer coding, when finding the pixel-correspondence between ROI regions, one may not need to consider the top/left position for the reference layer ROI and the scaled reference layer (current picture) ROI. Thus, in all equations above, one could remove references to fRefLeftOffset, fRefTopOffset, fCurLeftOffset and fCurTopOffset.

Figure 6A:
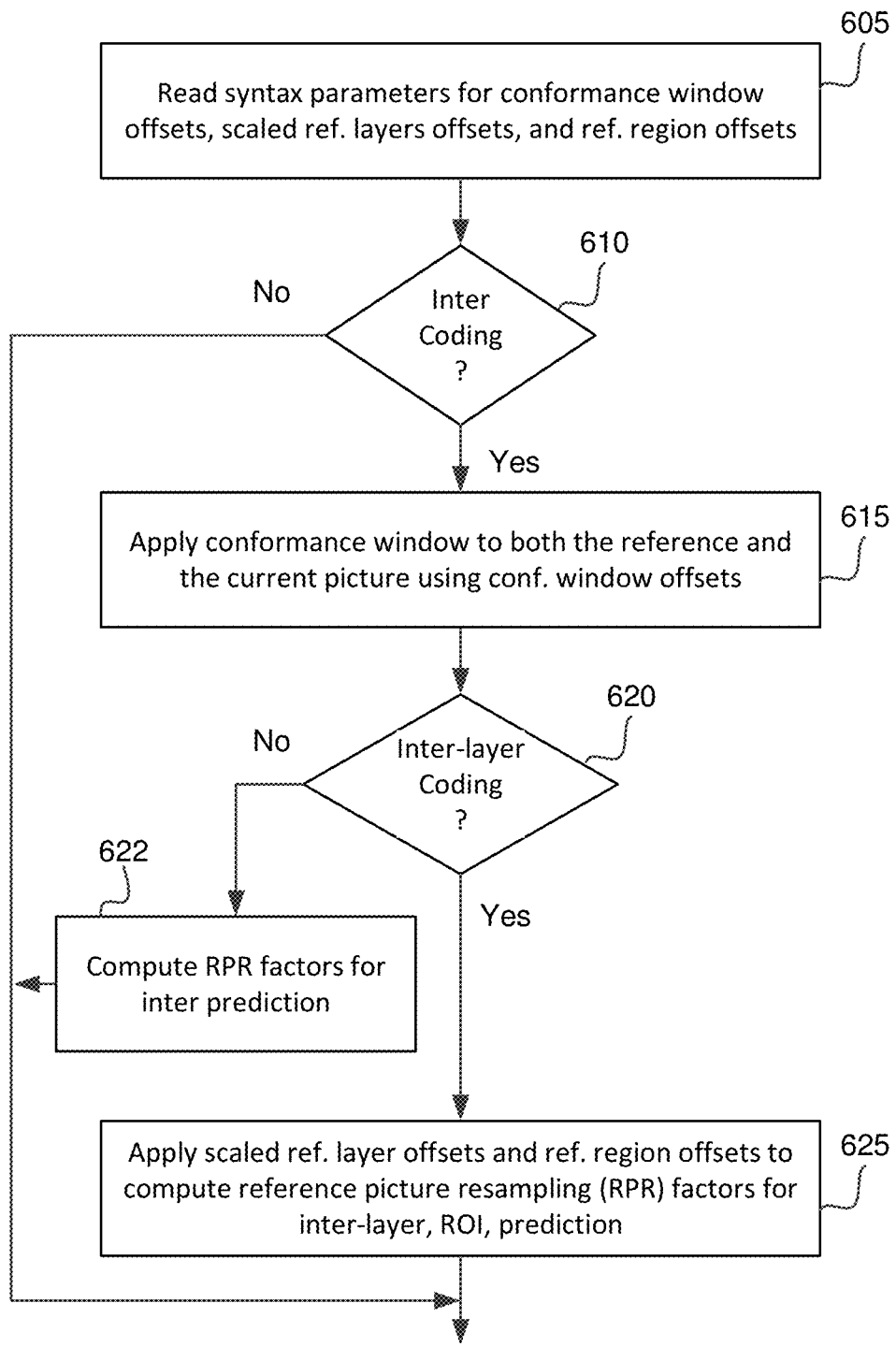
FIG. 6A and FIG. 6B depict example process flows supporting canvas-size scalability according to embodiments of this invention.

FIG. 6A provides an example summary of the above process flow. As depicted in FIG. 6A, in step 605, a decoder may receive syntax parameters related to the conformance window (e.g., conf_win_xxx_offset, with xxx being left, top, right, or bottom), the scaled reference layer offsets for current picture (e.g., scaled_ref_layer_xxx_offset[ ]) and the reference layer region offsets (e.g., ref_region_xxx_offset[ ]). If there is no inter-coding (step 610), decoding proceeds as in single layer decoding, otherwise, in step 615, the decoder computes the conformance windows for both the reference and the current picture (e.g., using equations (7-43) and (7-44)). If there is no interlayer coding (step 620), in step 622, one still needs to compute the RPR scaling factors for inter prediction for pictures with different resolution in the same layer, then decoding proceeds as in single layer decoding, otherwise (with inter-layer coding), the decoder computes the scaling factors for the current and reference pictures based on the received offsets (e.g., by computing hori_scale_fp and vert_scale_fp in equations (8-753) and (8-754)).

As presented earlier (e.g., see equations (8-x1) to (8-x2)), a decoder needs to compute the width and height of the reference ROI (e.g., fRefWidth and fRefHeight), by subtracting from PicOutputWidthL and PicOutputHeightL of the reference layer picture the left and right offset values (e.g., RefLayerRegionLeftOffset and RefLayerRegionRightOffset), and the top and bottom offsets (e.g., RefLayerRegionTopOffset and RefLayerRegionBottomOffset) of the reference layer.

Similarly (e.g., see equations (8-x3) to (8-x4)), the decoder needs to compute the width and height of the current ROI (e.g., fCurWidth and fCurHeight), by subtracting from PicOutputWidthL and PicOutputHeightL of the current layer picture the left and right offset values (e.g., ScaledRefLayerLeftOffset and ScaledRefLayerRightOffset) and the top and bottom offsets (e.g., ScaledRefLayerTopOffset and ScaledRefLayerBottomOffset). Given these adjusted sizes for the current and reference ROI, the decoder determines the horizontal and vertical scaling factors (e.g., see equations (8-753) and (8-754)) as in the existing VVC RPR block (e.g., processing from equation (8-755) to equation (8-766)) with minimal additional modifications needed (shown above in Italics).

In equations (8-x5) to (8-x8), adjusted left and top offsets are also computed to determine the correct position of the reference and current ROIs with respect to the top-left corner of the conformance window for proper pixel correspondence.

In a second embodiment, one may redefine the definition of the ref_region_xxx_offset[ ] and scaled_ref_region_xxx_offsetH offsets to combine (e.g., by adding them together) both the conformance window offsets and the ROI offsets. For example, in Table 5, one may replace scaled_ref_layer_xxx_offset with scaled_ref_layer_xxx_offset_sum defined as:

scaled_ref_layer_left_offset_sum[ ]=scaled_ref_layer_ left_offset[ ]+conf_win_left_offset scaled_ref_layer_top_offset_sum[ ]=scaled_ref_layer_ top_offset[ ]+conf_win_top_offset scaled_ref_layer_right_offset_sum[ ]=scaled_ref_layer_right_offset[ ]+conf_win_right_offset scaled_ref_layer_bottom_offset_sum[ ]=scaled_ref_layer_bottom_offset[ ]+conf_win_bottom_offset  (1)

Similar definitions can also be generated for ref_region_xxx_offset_sum, for xxx=bottom, top, left, and right. As will be explained, these parameters allow a decoder to skip step 615, since the processing in step 615 may be combined with the processing in step 625.

As an example, in FIG. 6A:
a) in step 615, one may compute PicOutputWidthL by subtracting from the picture width the conformance window left and right offsets (e.g., see equation (7-43))
b) Let fCurWidth=PicOutputWidthL
c) then, in step 625, one adjusts fCurWidth (e.g., see (8-x3)) by subtracting the ScaledRefLayer left and right offsets; however, from equations (7-xx), these are based on the scaled_ref_layer left and right offsets. For example, considering just the width of the current ROI, in a simplified notation (that is, by ignoring the SubWidthC scaling parameter), it can be computed as follows:

Picture output width=picture width−(conformance window left offset+conformance window right offset)  (2)

ROI current width=Picture output width−(ROI current left offset+ROI current right offset)  (3)

By combining equations (2) and (3) together,

ROI current width=picture width−((conformance window left offset+ROI current left offset)+(conformance window right offset+ROI current right offset))  (4)

Let

ROI current left sum offset=conformance window left offset+ROI current left offset ROI current right sum offset=conformance window right offset+ROI current right offset then, equation (4) can be simplified as ROI current width=picture width−((ROI current left sum offset)+(ROI current right sum offset))  (5)

The definition of the new "sum" offsets (e.g., ROI current left sum offset) corresponds to the those of ref_region_left_offset_sum defined earlier in equation (1).

Thus, as described above, if one redefines the scaled_ref_layer left and right offsets to include the sum of the layer's conf_win_left_offset, steps in blocks (615) and (625) to compute the width and height of the current and reference ROIs (e.g., equations (2) and (3)) can be combined into one (e.g., equation (5)) (say, in step 630).

Figure 6B:
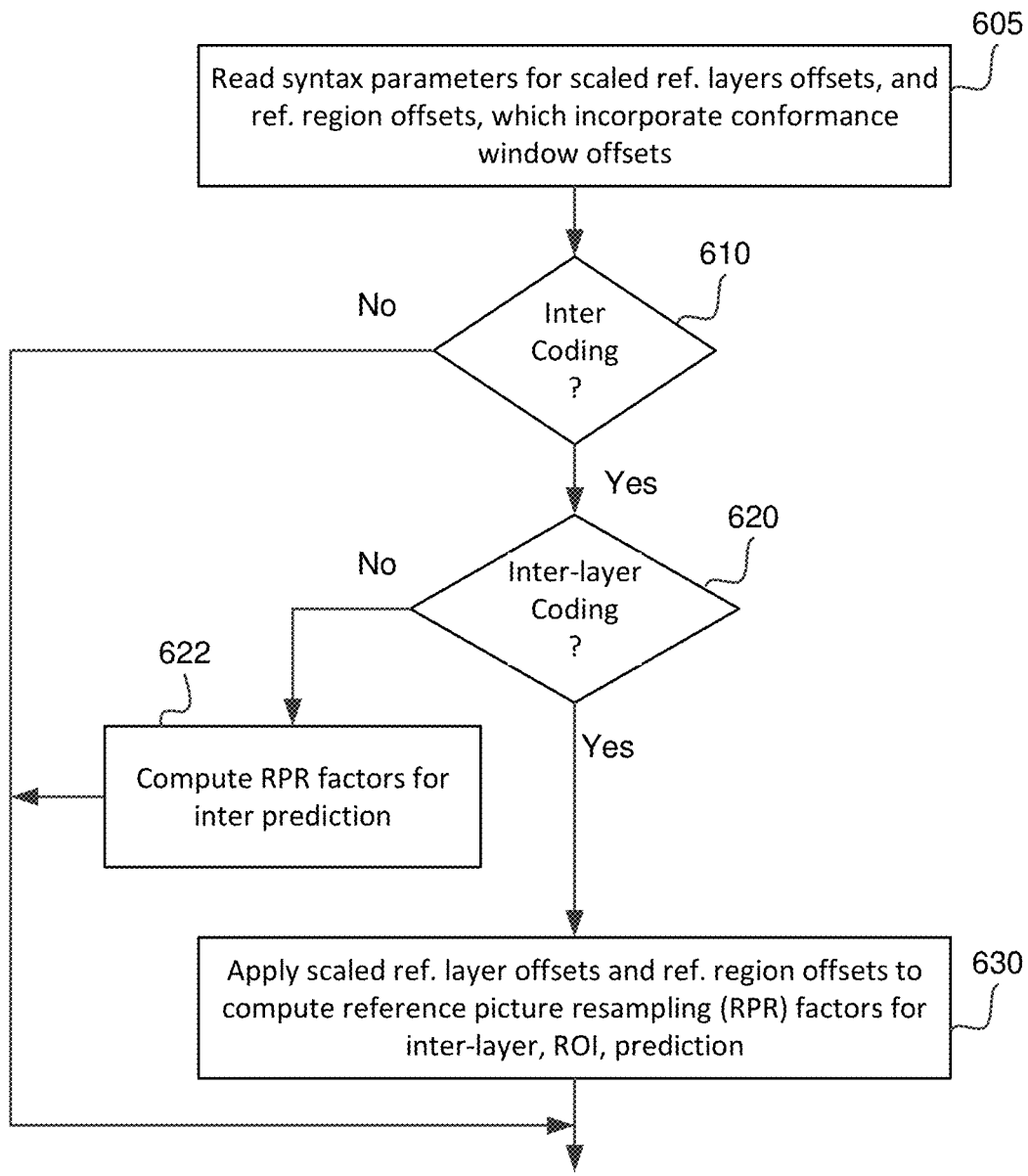

As depicted in FIG. 6B, steps 615 and 625 can now be combined into a single step 630. Compared to FIG. 6A, this approach saves some additions, but the revised offsets (e.g., scaled_ref_layer_left_offset_sum[ ]) are now larger quantities, so they require more bits to be encoded in the bitstream. Note that the conf_win_xxx_offset values may be different for each layer and their values can be extracted by the PPS information in each layer.

In a third embodiment, one may explicitly signal the horizontal and vertical scaling factors (e.g. hori_scale_fp and vert_scale_fp) among the inter-layer pictures. In such a scenario, for each layer one needs to communicate the horizontal and vertical scaling factors and the top and left offsets.

Similar approaches are applicable to embodiments with pictures incorporating multiple ROIs in each one, using arbitrary up-sampling and down-sampling filters.

References

Each one of the references listed herein is incorporated by reference in its entirety.

[1] *High efficiency video coding*, H.265, Series H, Coding of moving video, ITU, (February 2018).
[2] B. Bross, J. Chen, and S. Liu, "*Versatile Video Coding (Draft 6),*" JVET output document, JVET-O2001, vE, uploaded Jul. 31, 2019.
[3] S. Wenger, et al., "AHG8: *Spatial scalability using reference picture resampling,*" JVET-O0045, JVET Meeting, Gothenburg, SE, July 2019.
[4] R. Skupin et al., AHG12: "*On filtering of independently coded region,*" JVET-O0494 (v3), JVET Meeting, Gothenburg, SE, July 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to canvas size scalability, such as those described herein. The computer and/or IC may compute any of a variety of parameters or values that relate to canvas size scalability described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to canvas size scalability as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to canvas size scalability are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus to decode a coded bitstream, the apparatus comprising:
an input to receive a coded bitstream; and
a processor to process encoded pictures in the coded bitstream, wherein, for a current picture in the coded bitstream, the processor:
receives a current picture width and a current picture height comprising unsigned integer values;
receives first offset parameters determining a rectangular area on the current picture, wherein the first offset parameters comprise signed integer values;
computes a current area width and a current area height for the rectangular area on the current picture based on the current picture width, the current picture height, and the first offset parameters;
for a reference area, accessing a reference area width, a reference area height, a reference area left offset, and a reference area top offset, wherein accessing the reference area width and the reference area height, further comprises, for a reference picture:
accessing a reference picture width and a reference picture height;
receiving second offset parameters determining a rectangular area in the reference picture, wherein the second offset parameters comprise signed integer values;
computing the reference area width and the reference area height for the rectangular area in the reference picture based on the reference picture width, the reference picture height and the second offset parameters; and
computing the reference area left offset and the reference area top offset based on the second offset parameters;
computes a horizontal scaling factor based on the current area width and the reference area width;
computes a vertical scaling factor based on the current area height and the reference area height;
computes a left-offset adjustment and a top-offset adjustment of the current area based on the first offset parameters; and
performs motion compensation based on the horizontal and vertical scaling factors, the left-offset adjustment, the top-offset adjustment, the reference area left offset, and the reference area top offset.

2. The apparatus of claim 1, wherein the first offset parameters comprise a left offset, a top offset, a right offset, and a bottom offset.

3. The apparatus of claim 2, wherein one or more of the left offset, the top offset, the right offset, or the bottom offset comprise values between $-2^{14}$ and $2^{14}$.

4. The apparatus of claim 2, wherein computing the current area width comprises subtracting from the current picture width a first sum of the left offset and the right offset, and computing the current area height comprises subtracting from the current picture height a second sum of the top offset and the bottom offset.

5. The apparatus of claim 1, wherein computing the horizontal scaling factor (hori_scale_fp) comprises computing hori_scale_fp=((fRefWidth <<14)+ (fCurWidth>>1))/fCurWidth wherein fRefWidth denotes the reference area width and fCurWidth denotes the current area width.

6. The apparatus of claim 1, wherein performing motion compensation comprises computing refxSb$_L$=(((xSb-fCurLeftOffset)<<4)+refMvLX [0]) * hori_scale_fp refx$_L$=((Sign (refxSb$_L$) *((Abs (refxSb$_L$)+128) >> 8) +XL * ((hori_scale_fp+8) >>4))+32) >>6+ (fRefLeftOffset <<4)

refySbL=(((ySb-fCurTopOffset)<<4)+refMvLX [1]) *vert_scale_fp refyL=((Sign (refySbL) *((Abs (refySbL)+ 128) >>8)+yL ((vert_scale_fp+8) >>4))+ 32) >>6+ (fRefTopOffset <<4)

wherein hori_scale_fp denotes the horizontal scaling factor, vert_scale_fp denotes the vertical scaling fcator, fCurLeft- Offset denotes the left-offset adjustment, fCurTopOffset denotes the top-offset adjustment, fRefLeftOffset denotes the reference area left offset, fRefTopOffset denotes the reference area top offset, and $(refxSb_L, refySb_L)$ and $(refx_L, refy_L)$ are luma locations pointed to by a motion vector (refMvLX [0], refMvLX [1]) given in ¹⁄₁₆-sample units.

\* \* \* \* \*